United States Patent [19]
Edlund et al.

[11] 3,870,855
[45] Mar. 11, 1975

[54] ELECTRIC HEATING AND BATTERY CHARGING SYSTEM FOR MOTOR VEHICLE

[75] Inventors: Lars Anders Edlund, Kalmar; Berth Atle Wikström, Ljungbyholm, both of Sweden

[73] Assignee: Berth Wikström AB, Slojdgatan, Kalmar, Sweden

[22] Filed: Jan. 23, 1974

[21] Appl. No.: 436,016

[30] Foreign Application Priority Data
Jan. 23, 1973 Sweden .......................... 7300890

[52] U.S. Cl. .......... 219/202, 123/142.5 E, 219/205, 219/279, 237/12.3 R, 320/2, 320/5
[51] Int. Cl. ...................... H05b 1/02, F02n 17/02
[58] Field of Search .......... 219/202, 205, 208, 209, 219/279; 320/5, 2; 123/142.5, 142.5 E; 237/8 A, 12.3 B, 12.3 R

[56] References Cited
UNITED STATES PATENTS

| | | |
|---|---|---|
| 1,372,864 | 3/1921 | Cox .............................. 219/205 X |
| 1,863,882 | 6/1932 | Scharf ......................... 219/202 UX |
| 2,427,713 | 9/1947 | Caldwell ....................... 219/209 X |
| 2,654,826 | 10/1953 | Spurlin ......................... 219/205 X |
| 2,819,373 | 1/1958 | Allman ........................... 219/202 |
| 2,827,540 | 3/1958 | Underwood ..................... 219/279 |
| 3,673,379 | 6/1972 | Eversull ........................... 219/202 |

FOREIGN PATENTS OR APPLICATIONS 668,290  11/1938  Germany ..................... 123/142.5 E

*Primary Examiner*—A. Bartis
*Attorney, Agent, or Firm*—Sughrue, Rothwell, Mion, Zinn & Macpeak

[57] ABSTRACT

A combination battery charger (11), motor heater (5), and passenger compartment heater (1) for a vehicle. A central unit (3) mounted on the motor compartment side of the fire wall is adapted to be plugged into a house current socket, and contains a relay (15) for enabling the motor and passenger compartment heater to be controlled by an adjustable timer (2). Alternately, the motor heater may be continuously energized through a switch (16). The system is intended to facilitate cold weather vehicle operation.

3 Claims, 2 Drawing Figures

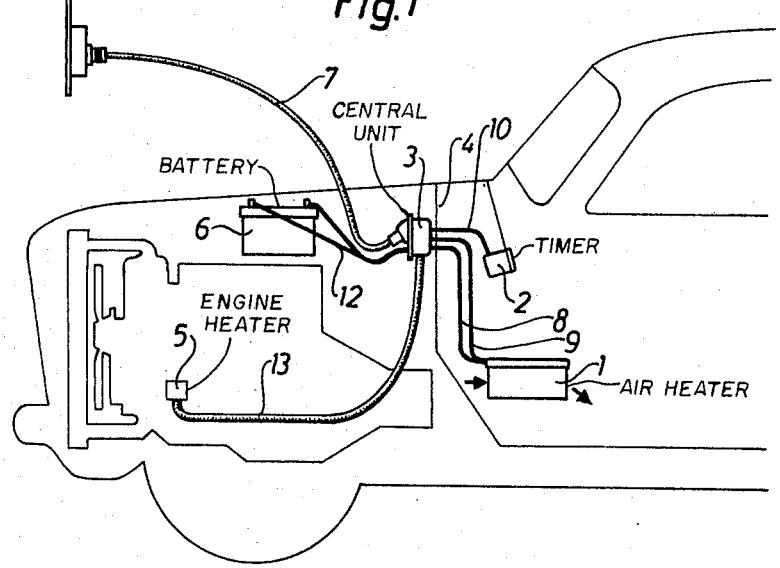
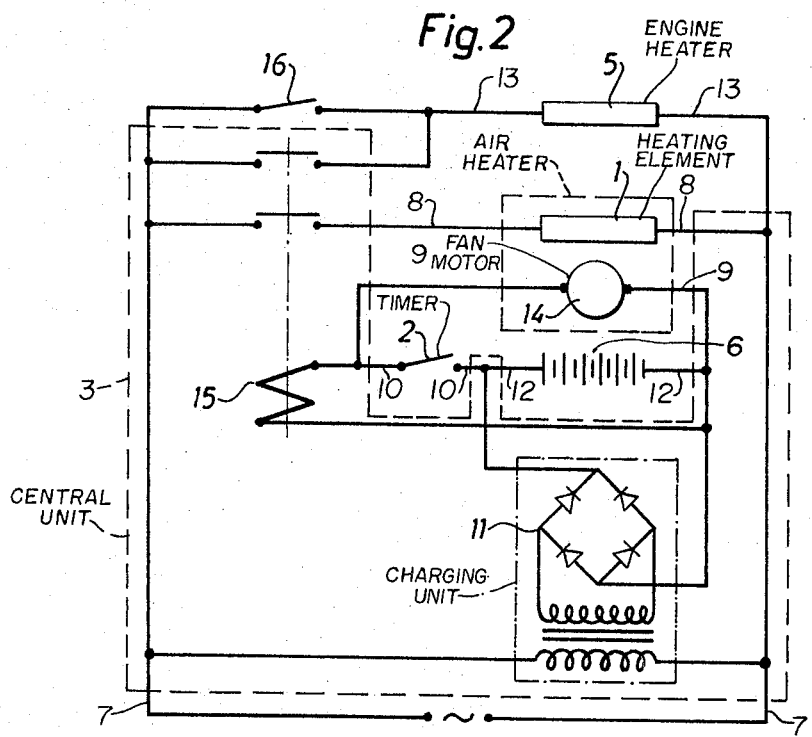

ELECTRIC HEATING AND BATTERY CHARGING SYSTEM FOR MOTOR VEHICLE

BACKGROUND OF THE INVENTION

1. Field of the Invention

This invention relates to a system for electrically heating a vehicle charging the vehicle electric battery.

2. Description of the prior Art

Electric heaters for the internal combustion engines of motorcars are widely used. Such motor heaters are connected to the electric mains. In cold weather the motor heater is often connected to the electric mains in the evening to keep the motor warm during the night and give an easy start in the morning.

Recently electric passenger compartment heaters have been used for defrosting of the vehicles windows and warming up the seats. Such heaters have hitherto usually been designed for placing on the floor of the parked vehicle, although they have also been permanently mounted.

The electric heaters have, however, such a high power consumption that a continuous connection to the electric mains during the whole parking time, i.e. during the whole night, is too expensive. Therefore a timer has been used for starting the heater, for instance 2 hours before the time when the vehicle is supposed to be used. In order to avoid a high-voltage installation in the vehicle, the timer has usually been attached to a mains house wall socket-outlet.

When using the vehicle for short drives in winter time with high power consumption for lamps, fans, etc. a periodic recharge of the electric battery of the vehicle is necessary. There are different types of battery chargers available in the market, which make it necessary to have the battery taken out of the vehicle, although a tedious electric connetion of the battery to the charger is sometimes also possible.

SUMMARY OF THE INVENTION

The electric vehicle heating system according to the present invention is in all its parts permanently mounted in the vehicle. By connecting the mains to the electric outlet of the vehicle, the vehicle battery will be charged during the whole time of connection, the motor will be heated either during the whole time of connection or during the time set on the timer, whereas the passenger compartment be on only during the time set on the timer. The heating system according to the present invention is more easily operated than the conventional systems described above. Furthermore, the system according to this invention presents a safer solution because of the fact that the owner of the vehicle only has one connection to the elctric mains and because the timer and the passenger compartment heater fan are operated at low voltage.

The present invention thus mainly consists in a system for the electric heating of vehicles comprising a permanently mounted, fan operated warm air heater and a central unit containing a unit for charging the vehicle electric battery. The charging unit is arranged when connecting the system to the electric mains immediately and during the whole time of connection to charge the electric battery, whereas the heating element of the air heater supplied from the mains is operated via a relay, the coil of said relay being operated with low voltage from the charging unit (the vehicle battery,) the operation of the relay being further controlled by a timer permanently mounted in the vehicle. The timer, when starting operation of the heating element via the relay, at the same time starts the fan motor by connecting it to the vehicle battery.

Suitably the system is of the kind in which the central unit also controls an electric heater for the vehicle motor, the central unit being equipped with a manual switch enabling the choice between timer controlled operation of the motor heater simultaneously with the air heater or continuous operation of the motor heater during the whole time during which the vehicle is connected to the mains.

According to a further embodiment of the invention the central unit is designed so as to be able to be mounted on the wall between the motor and passenger compartments the electric cables connecting the central unit—mounted at the motor compartment side—with the air heater and the timer—mounted at the passenger compartment side of the wall—running from the central unit directly through the partition wall or fire wall in such a way that no part of said cables has an open location within the motor compartment.

BRIEF DESCRIPTION OF THE DRAWINGS

FIG. 1 shows a heat system according to the invention in a car.

FiG. 2 shows a circuit diagram adaptable to the system according to FiG. 1

DESCRIPTION OF THE PREFERRED EMBODIMENT

According to the arrangement shown in FIG. 1 the electric heater 1 is mounted in the passenger compartment of the vehicle. In the passenger compartment there is also a timer 2 and suitably also a manual switch. A central unit 3 is mounted on the wall 4 between the motor compartment and the passenger compartment. In the motor compartment the electric engine heater 5 and the electric battery 6 are mounted. When opearting the system the central unit 3 is connected to the mains by means of a cable 7.

The passenger compartment heater 1 is electrically connected to the central unit 3 by means of a main voltage cable 8 and also by means of a low voltage cable 9. The timer 2 is also connected to the central unit 3 by means of a low voltage cable 10. Charging of the battery 5 is achieved by means of the charging unit 11 of the central unit 3 via a cable 12. The motor heater 5 is connected to the central unit 3 via the cable 13.

The circuit diagram according to FIG. 2 shows how the charging unit 11 is connected to the battery 6. The timer 2 operates the relay 15 giving power to the engine heater 5 and the air heater 1, the fan motor 14 of said heater being simultaneously started over the contact 2 of the timer, the fan motor 13 being thus fed by DC-current. A very small motor with a high number of revolutions (about 7000 r/m) may thus be used, resulting in a small and efficient air heater.

What is claimed is:

1. A combination battery charger and heater system for a motor vehicle, said system adapted to be energized by a conventional alternating current power source such as 115 volt a. c. or the like, comprising:

a. a warm air heater permanently mounted in the vehicle and including an electric heating element and an electric fan, b. a central control unit permanently mounted in the vehicle and including:
  1. an electric connector adapted to be connected to an outside source of alternating current,
  2. a battery charger permanently coupled between the connector and the vehicle battery, and
  3. a relay coil and associated contacts for coupling the electric heating element to the connector, and
c. a timer permanently mounted in the vehicle and connected in series with the vehicle battery and the electric fan for energizing the fan with low voltage DC power, the timer also being connected in series with the relay coil and the battery simultaneously energizing the relay coil with low voltage DC power.

2. A system according to claim 1, further comprising a vehicle motor heater adapted to be energized by the outside source of alternating current through the connector under control of the relay contacts of the central control unit, said unit further comprising a manual switch connected in parallel with the relay contacts to thereby enable a choice between timer controlled operation of the motor heater simultaneously with the warm air heater and continuous operation of the motor heater during the whole time the system is operable.

3. A system according to claim 1, wherein the central control unit is mounted at a motor compartment side on a wall between a motor compartment and a passenger compartment of the vehicle, electrical cables connecting the unit with the air heater and the timer, both mounted within the passenger compartment, said cables running from the unit directly through the wall into the passenger compartment such that no part of said cables are located within the motor compartment.

* * * * *